United States Patent [19]

Papafingos et al.

[11] 4,030,914
[45] June 21, 1977

[54] METHOD OF TREATING ALUMINUM DROSSES, SKIMS AND SLAGS

[75] Inventors: Pandelis N. Papafingos; Richard T. Lance, both of Riverside, Calif.

[73] Assignee: Alumax Mill Products, Inc., Riverside, Calif.

[22] Filed: Apr. 12, 1976

[21] Appl. No.: 676,170

[52] U.S. Cl. .................................. 75/68 R; 75/24; 75/93 R; 75/93 AC; 75/257
[51] Int. Cl.² ............................................. C22B 21/00
[58] Field of Search ...... 75/68 R, 24, 93 R, 93 AC, 75/94

[56] References Cited
UNITED STATES PATENTS
3,676,105  7/1972  McLeod et al. ................ 75/68 R FOREIGN PATENTS OR APPLICATIONS
784,884  10/1957  United Kingdom ............ 75/68 R

*Primary Examiner*—M. J. Andrews
*Attorney, Agent, or Firm*—Knobbe, Martens, Olson, Hubbard & Bear

[57] ABSTRACT

Aluminum drosses, skims and slags are treated by melting under a cover flux comprising sodium chloride or potassium chloride or mixtures thereof in combination with calcium chloride, the calcium chloride comprising from about 1 to about 50% of the flux composition.

2 Claims, No Drawings

METHOD OF TREATING ALUMINUM DROSSES, SKIMS AND SLAGS

This invention relates to the utilization and treatment of aluminum dross by a novel flux consisting of calcium chloride in combination with potassium chloride or sodium chloride, or mixtures of potassium and sodium chloride. Numerous methods and flux compositions have been proposed for the treatment of aluminum drosses. Additionally, fluxes and other materials and procedures have been disclosed for the melting of scrap aluminum. While there are some common principles between the melting of scrap aluminum and the treatment of aluminum drosses, the composition and the characteristics of these two materials are so different, the procedures and techniques for handling these materials are so diverse and the end products desired in the treatment of these two different materials so distinct, that it is difficult to extend the teachings in one of the arts to the other. Indeed, it may fairly be stated that these are non-analogous arts because the principles, desired results, and practices are so diverse.

A number of flux compositions are disclosed which include fluoride salt. For example, Robbins, U.S. Pat. No. 3,189,491, discloses a flux which is a blend of sodium chloride, calcium and barium chloride and calcium fluoride. This disclosure is significant in that even though the composition contains calcium chloride, these compositions require the fluoride salt, or at least it has hitherto been universally believed that such compositions would require the fluoride salts. McLeod et al., U.S. Pat. No. 3,676,105, teaches that fluoride in the dross may be used as a constitutent of the flux composition, thus obviating the need for adding fluoride to the flux directly. Consequently, many processes which do not specifically disclose the addition of fluoride to the flux inherently result in fluoride being added to the flux from the dross. This is the case, in a previous step, the dross has been subjected to a fluoride treatment and, consequently, contains that element. As will be discussed in further detail hereinafter, fluoride is no longer acceptable in many areas and in many processes and, consequently, fluoride will not appear in the dross of many processes. Wille et al., U.S. Pat. No. 2,148,664, discloses a fused salt bath heating composition for heat treat, not for recovery of aluminum values from dross, in which the bath is made up of a mixture of calcium chloride, barium chloride and sodium chloride. This composition is taught only as a means for heating and heat treating metals and is not suggested as a constituent in the treatment of aluminum drosses nor is there any reason in the prior art which would suggest the utility of such a composition in the recovery of aluminum dross values.

Brondyke et al., U.S. Pat. No. 3,649,247, discloses, quite incidentally to the main disclosure, a flux which consists of a 40–50% potassium chloride constituent and a 50–60% magnesium chloride constituent for use in melting of aluminum scrap, and not for treating dross.

Aluminum alloys, in the solid or molten form, are covered with an oxide skin, this protective coating consists mainly of aluminum oxides, carbides, nitrides and sulfides. If the oxide film on molten aluminum is ruptured, it forms again immediately. A repetitive rupture and formation of the oxide is of great concern in the aluminum industry since an excessive amount of oxide formations reduce the aluminum recovery during melting and, in turn, increases the amount of drosses that need to be handled. The excessive dross formation could be due to a multitude of reasons, alone or compounded. For example, excessive temperatures, unnecessary agitation, the introduction of alloys containing large amounts of magnesium, the size and quality of the scrap charge, the moisture present, etc., all affect the amount of dross which ultimately will be formed. The aluminum industry in its efforts to reduce the formation of oxides and increase its recovery of metal is using two fundamental approaches. First, great efforts are expended in the prevention and formation of oxides of aluminum. Secondly, oxides are removed from the surface of aluminum melts in order to recover the metal values contained therein.

The first effort consists of mechanical considerations, the type and shape of the furnace, the type of the burner, and other arrangements that reduce excessive temperature, unnecessary agitation, and reduce the exposed metal surface. In addition, it is advantageous to reduce thermitting by rapid cooling of skims, although most processes actually encourage thermitting as an aid in recovering only a part of the aluminum metal values contained in the dross.

Cover fluxes are used in all efficient efforts to reduce available surfaces. Fluxes also act, in certain cases, to reduce or increase the temperature of formation or act chemically or otherwise to prevent the formation of oxides and, sometimes, are an integral part of the process of removing the oxide and allowing the metal to flow and be separated. Presently, there are a number of salt mixtures used to prevent the formation of oxides on molten aluminum or to recover metal values from aluminum drosses.

Mixtures of sodium chloride or potassium chloride are used in various ratios, preferably in the ratio of a low temperature eutectic which is about 44% sodium chloride and 66% potassium chloride by weight, with a melting point of 1225° F. This mixture has the advantage of being a low cost salt and is used either as a cover flux to prevent the formation of oxides or as a mixture worked into the skin to separate the metal entrapped therein from the various oxides, carbides, nitrides, etc. This salt does not, in essence, attack the oxide coating of small aluminum droplets that are comingled in the skin. Such a mixture can be used in rotary furnaces and, as taught by Lowry, U.S. Pat. No. 3,043,678, is used in combination with Cryolite. Cryolite is generally considered to be a necessary ingredient in sodium chloride-potassium chloride fluxes. Straight chloride fluxes are generally considered to be ineffective in separating the metallic content from the skin without the aid of a cleansing flux; fluoride salts, such as Cryolite, being added as the cleansing flux constituent. It is known that fluorides, through chemical action, permit the separation of metal values from aluminum dross. Such fluorides are usually added in the form of Cryolite of sodium fluoride but other fluoride salts may be used. The sodium chloride-potassium chloride mix provides the carrier and the fluoride provides the separatory action. The prior art teaches that fluorides have a higher surface tension than chlorides and, therefore, the fluorides reduce the wetting power of the chloride flux without increasing the viscosity. Thus, fluorides have a higher surface tension which should work against an optimum separation of the metal from the oxides. However, if, in a mixture at the proper melting point, the surface tension and fluidity is sufficiently reduced, the flux will effectively penetrate the skin. The wetting power can be increased so that the mixture can be more effective than a salt containing fluorides.

According to this invention, blended flux compositions containing potassium chloride and calcium chloride or sodium chloride and calcium chloride or mixtures of sodium and potassium chloride in combination with calcium chloride are so superior that they can effectively work considerably better, cheaper and with higher recoveries than presently known flux compositions. These potassium chloride-calcium chloride and sodium chloride-calcium chloride flux mixtures separate the oxides from the metal at low temperatures, i.e., temperatures just above the melting point of aluminum. This is an advantage and a result not hitherto accomplished. This advantage reduces the aluminum oxidation and, consequently, the amount of dross formed, so as to produce higher recoveries. The ratio of potassium chloride to calcium chloride or sodium chloride can be varied to fit the various conditions of temperature which may be required in any given process since the melting point of the various flux compositions falling within this definition can be tailored to fit the specific operation or equipment in which the process is being carried out. The addition of more calcium chloride decreases the melting point of the flux up to a concentration of about 50% calcium chloride. The addition of calcium chloride to sodium chloride has the same effect as described above with respect to potassium chloride-calcium chloride. Aluminum recoveries are increased because of the presence of the cleansing action of calcium chloride, whether in combination with potassium chloride or sodium chloride, however, calcium chloride-potassium chloride are more effective because of better viscosity characteristics than calcium chloride-sodium chloride blends.

Desired results can be obtained, using the appropriate ratio, in either a rotary furnace or in a stationary furnace or in a stationary well. In a stationary well, the problem always has been that it was impossible to keep the well hot enough in order to skim and obtain effective separation. The addition of exothermic mixes have helped the separation, but this was at the expense of the total aluminum recovery, since higher temperatures create oxidation. Furthermore, the exothermic reactions have created undesirable by-products, including fluoride containing gases or dispersions.

The present process using potassium chloride-calcium chloride or sodium chloride-calcium chloride blended fluxes has the additional and very distinct advantage that the process is ecologically acceptable. The use of Cryolite or other fluoride containing by-products are illegal in many states and are a serious ecological hazard wherever used. It is expected that fluoride salts will not be permitted in any aluminum dross recovery system within the next few years.

Sodium chloride in the molten state, either alone or in combination with potassium chloride, or Cryolite or other fluoride products produces a viscous, sticky melt. Sodium chloride is plastic, particularly at high temperatures, while the potassium chloride-calcium chloride blend is fluid and penetrates the pores of the oxides with superior separation action. Simply by adding calcium chloride to potassium chloride one can vary the melting point of the mixture to the desired temperature level. For example, commercial potassium chloride has a melting point of 1550° F while a 5% calcium chloride addition drops the melting point to 1390° F and at 50% calcium chloride the melting point is as low as 1115° F. The practical level is usually just above the melting point of aluminum. If one uses a rotary dross furnace, the melting point can be tailored to coincide with the melting point of aluminum and thus operate without excessive temperatures. If one uses stationary wells, by using the tailored mixture, one can avoid salt solidification which is common in wells which are difficult to keep at the proper temperature. Most importantly, is the fact that an extremely fluid bath, which results in high recovery and high penetration of the dross by the flux is obtained and maintained according to the principles of this invention.

In processing dross in a rotary furnace, the present use of Cryolite or other fluoride compounds is either illegal or is restricted so that its furnace is highly questionable. In cases where fluoride compounds are not used, the recovery of aluminums are quite low. For example, Lowry et al, claimed that by the use of a sodium chloride-potassium chloride mixed flux, aluminum recoveries averaged only 60% in a rotary furnace while the use of a flux containing from 2.5 to 5.0 % Cryolite increased the recovery to 94%, in their particular apparatus. It is, of course, well understood in the art that aluminum recoveries depend highly upon the particular apparatus and upon the particular process carried out. Comparisons and evaluations, therefore, cannot be made between different plants without taking into account differences in technique, materials and equipment. Comparisons and evaluations can be made only on a basis of the same product of dross which is dedrossed in the same manner. Direct comparison, therefore, cannot be made from one factory to another involving different alloys, different techniques or different equipment.

Comparisons can be made, however, using a given dross recovery method but different flux compositions, for example, in a given process recovery of aluminum was only 58% using a 45% potassium chloride-55% sodium chloride mixed flux salt. A great increase in aluminum recovery, to 72%, was obtained merely by using a 95% potassium chloride-5% calcium chloride flux composition. Similarly, using the same mix in wells has increased recoveries as much as 15–20% above those obtained using the conventional potassium chloride-sodium chloride flux salt composition. Similar results were obtained using blends of sodium chloride and calcium chloride.

Comparisons made with other salt mixtures showed that the potassium chloride-calcium chloride combination was much more flexible in reducing the melting point of the mixture, thus allowing flexibility to fit the particular operation. Other salts do not give this flexibility. For example, a mixture of 5 % magnesium chloride and 95% potassium chloride or 20% magnesium and 80% potassium chloride resulted in a solidification point in the area of 1300° F. The solidification point of a 5% calcium chloride-95% potassium chloride flux was 1395° F while a 20% calcium chloride-80% potassium chloride flux has a solidification point of 1200° F, giving a latitude of 190° F. Since the melting point of aluminum is the area of 1220° F, a salt mixture which melts in this temperature range would generally be most appropriate. Unlike the calcium chloride-potassium chloride and calcium chloride-sodium chloride flux salts of this invention, comparable blends of magnesium chloride with potassium or sodium chloride does not result in a satisfactory flux.

The advantages of the inventive process include the ability to tailor blend flux compositions for the recovery of aluminum and aluminum alloys at above about 1180° F, at high efficiency with high aluminum recovery, without the necessity of adding ecologically unsatisfactory fluoride compounds. In general, most effective results are accomplished where the ratio of the flux to the dross ranges from about 1 part of flux to about 6 parts of dross down to about 1 part of flux to about 1 part of dross. Among the advantages resulting from the invention is the ability of readily dissolving non-metallic impurities ordinarily associated with such alloys and without the necessity of including ecologically unacceptable fluorides.

In general, the flux composition of this invention includes potassium chloride from 99% down to about 50% and calcium chloride from about 1% up to about 50% with like ratios of sodium chloride and calcium chloride; i.e., sodium chloride from 99% to 50% and calcium chloride from 1 to 50%.

It will be apparent from the foregoing discussion that a flux composition has been discovered which has been overlooked for nearly a century as an effective flux in the process of recoverying aluminum values from aluminum dross. That this discovery has eluded the art for several decades seems, at first, blush, anomalous but is better understood when it is considered that in this particular class of compositions, calcium chloride with potassium or sodium chloride, the calcium chloride behaves differently than the other alkaline earth chloride salt, magnesium chloride, which is reasonably available.

The preferred flux composition is calcium chloride in combination with potassium chloride containing from one to 50% and most preferably from 3% to 20% calcium chloride. Not quite as advantageous but still a great advance over the prior art blends of calcium chloride with sodium chloride in the range of from one to 50% calcium chloride and preferably from 3% to 15% calcium chloride. Within these ranges, considerable tailoring can be made simply by varying the amount of calcium chloride in the composition. Blends of potassium chloride and sodium chloride in combination with calcium chloride may be formulated under the principles of this invention but with some less advantage than blends of calcium chloride with either potassium or sodium chloride. It will be apparent from the foregoing discussion that the specific examples given do not limit the invention but provide the parameters for utilizing the invention, the scope of the invention being defined in the following claims.

I claim:

1. In a process for recovering aluminum from drosses, in which aluminum drosses are melted under a cover flux for the separation of aluminum metal values from the dross, the improvement wherein the metal flux consists essentially of potassium chloride and calcium chloride, with a calcium chloride content of from about 3 to about 20%.

2. In a process for recovering aluminum from drosses, in which aluminum drosses are melted under a cover flux for the separation of aluminum metal values from the dross, the improvement wherein the metal flux consists essentially of sodium chloride and calcium chloride, with a calcium chloride content of from about 3 to about 15%.

* * * * *

UNITED STATES PATENT AND TRADEMARK OFFICE
CERTIFICATE OF CORRECTION

PATENT NO. : 4,030,914

DATED : June 21, 1977

INVENTOR(S) : Pandelis N. Papafingos and Richard T. Lance

It is certified that error appears in the above-identified patent and that said Letters Patent are hereby corrected as shown below:

Column 4, line 16, change "furnace" to --future--.

Signed and Sealed this

Eighteenth Day of October 1977

[SEAL]

Attest:

RUTH C. MASON
*Attesting Officer*

LUTRELLE F. PARKER
*Acting Commissioner of Patents and Trademarks*